United States Patent
Hirai

(10) Patent No.: US 11,347,515 B2
(45) Date of Patent: May 31, 2022

(54) MANAGEMENT APPARATUS, METHOD, AND STORAGE MEDIUM

(71) Applicant: CANON KABUSHIKI KAISHA, Tokyo (JP)

(72) Inventor: Masahito Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/276,433

(22) Filed: Feb. 14, 2019

(65) Prior Publication Data
US 2019/0258491 A1   Aug. 22, 2019

(30) Foreign Application Priority Data
Feb. 20, 2018   (JP) .............................. JP2018-028259

(51) Int. Cl.
*G06F 3/14*   (2006.01)
*G06F 9/38*   (2018.01)
*G06F 9/30*   (2018.01)

(52) U.S. Cl.
CPC .............. *G06F 9/3885* (2013.01); *G06F 3/14* (2013.01); *G06F 9/30098* (2013.01)

(58) Field of Classification Search
CPC .... G06F 3/048; G06F 3/04817; G06F 3/0482; G06F 3/0484; G06F 3/04842; G06F 3/14; G06F 9/3885; G06F 9/30098
See application file for complete search history.

(56) References Cited

U.S. PATENT DOCUMENTS

| | | | | | |
|---|---|---|---|---|---|
| 5,832,471 | A | * | 11/1998 | Fukui | G06F 16/10 |
| 6,232,968 | B1 | * | 5/2001 | Alimpich | G06F 9/451 |
| | | | | | 715/744 |
| 2003/0053128 | A1 | * | 3/2003 | Oyama | G06Q 10/10 |
| | | | | | 358/1.15 |
| 2006/0034434 | A1 | * | 2/2006 | Kashi | G06F 40/117 |
| | | | | | 379/93.07 |
| 2006/0048004 | A1 | * | 3/2006 | Kawashima | G03G 15/5075 |
| | | | | | 714/23 |
| 2006/0139375 | A1 | * | 6/2006 | Rasmussen | G01C 21/32 |
| | | | | | 345/641 |
| 2010/0205559 | A1 | * | 8/2010 | Rose | G06F 3/0482 |
| | | | | | 715/781 |
| 2010/0269063 | A1 | * | 10/2010 | Takazawa | G06F 3/1204 |
| | | | | | 715/810 |
| 2011/0292428 | A1 | * | 12/2011 | Ishii | G06F 3/0488 |
| | | | | | 358/1.13 |

(Continued)

FOREIGN PATENT DOCUMENTS

JP   2009134401 A   6/2009
JP   2015-114895 A   6/2015

*Primary Examiner* — Kavita Stanley
*Assistant Examiner* — William Wong
(74) *Attorney, Agent, or Firm* — Canon U.S.A., Inc. IP Division

(57) ABSTRACT

One aspect of the present disclosure concerns a management apparatus configured to execute a device management software for realizing a plurality of functions for performing processing on a network device. The management apparatus additionally manages information about an extension function in a predetermined storage area to add an operation portion for calling processing of the extension function to an easy operation screen after the extension function is added to the device management software.

10 Claims, 12 Drawing Sheets

(56) References Cited

U.S. PATENT DOCUMENTS

| | | | | |
|---|---|---|---|---|
| 2012/0019554 A1* | 1/2012 | Narimatu | ............ | G06F 3/0481 |
| | | | | 345/629 |
| 2013/0265601 A1* | 10/2013 | Kaneko | ............... | G06F 3/1297 |
| | | | | 358/1.13 |
| 2014/0040800 A1* | 2/2014 | Fredette | .................. | G06F 8/38 |
| | | | | 715/765 |
| 2014/0222181 A1* | 8/2014 | Hemenway | ........... | G06F 3/0486 |
| | | | | 700/97 |
| 2016/0162227 A1* | 6/2016 | Kato | .................. | G06F 3/1291 |
| | | | | 358/1.13 |

* cited by examiner

FIG.3

DEVICE MANAGEMENT SOFTWARE

| | DEVICE NAME | HOST NAME | IP ADDRESS | SERIAL NUMBER | STATUS |
|---|---|---|---|---|---|
| ☐ | MFD 2200 | Can21 | 192.168.10.87 | 18993354 | |
| ☐ | MFD 2300 | Can31 | 192.168.10.100 | 18993344 | |
| ☐ | MFD 2800 | can44 | 192.168.10.110 | 189933643 | |
| ☐ | MFD 2100 | | 192.168.2.2 | 12345678 | |
| ☐ | MFD 2850 | | 192.168.2.4 | 189933688 | |

MENU — 301
SEARCH DEVICE — 302
ADD DEVICE — 303
304
PROPERTY — 305

FIG.4A

| | DEVICE NAME | HOST NAME | IP ADDRESS | SERIAL NUMBER |
|---|---|---|---|---|
| ☐ | MFD 2200 | Can21 | 192.168.10.87 | 18993354 |
| ☐ | MFD 2300 | Can31 | 192.168.10.100 | 18993344 |
| ☐ | MFD 2800 | can44 | 192.168.10.110 | 189933643 |

SELECT DEVICE

SELECT ALL   DESELECT ALL

NEXT

CONDITION OF TASK

PLEASE SELECT THE TYPE OF THE REPORT TO OUTPUT.

- ● ERROR LOG
- ○ JOB LOG
- ○ HISTORY OF CHANGE IN SETTING VALUE

BACK   NEXT

SET SCHEDULE

SCHEDULE

- ● EXECUTE IMMEDIATELY
- ○ EXECUTE AT SPECIFIED DATE AND TIME
- ○ EXECUTE REGULARLY

BACK   NEXT

~421

MANAGEMENT APPARATUS, METHOD, AND STORAGE MEDIUM

BACKGROUND

Field

The present disclosure relates to a technique for managing a network device including an image processing apparatus and the like via a network.

Description of the Related Art

In recent years, software has been developed for managing a network device such as an image processing apparatus (e.g., a printer, a camera, a scanner, and a multifunction peripheral) via a network (refer to, for example, Japanese Patent Application Laid-Open No. 2015-114895).

Some of such device management software applications provide one screen that provides operation buttons for operating functions regarding device management that an administrator frequently uses (hereinafter, this screen will be referred to as an easy operation screen). The device management software displays the easy operation screen when being started up, and thus the administrator can immediately use the frequently used operating functions.

The device management software disclosed in Japanese Patent Application Laid-Open No. 2015-114895 is configured to allow a plug-in program to realize an additional function to be added to the basic operations functions, thereby achieving function extension.

The device management software capable of achieving function extension may not be easy to use in a case where functions to be provided on the easy operation screen are fixed. For example, the function extension may lead to a change in priorities with regard to the functions that should be included in the easy operation screen among the existing functions, and the extension function. Further, too many operation buttons on the easy operation screen may also lead to a less effective operability for the administrator.

SUMMARY

According to an aspect of the present disclosure, a management apparatus includes a memory storing instructions related to a device management software for realizing a plurality of functions for performing processing on a network device, and at least one processor executing the instructions causing the management apparatus to manage, in a table, information about a portion of a plurality of functions that should be displayed on an operation screen provided when the device management software is started up, provide the operation screen, the operation screen including an operation portion for calling processing of the portion of the functions that corresponds to the managed information when the device management software is started up, provide a management screen for displaying a list indicating the network device targeted for management by the device management software, add information about an extension function to the table to add an operation portion for calling processing of the extension function to the operation screen after the extension function is added to the device management software, and provide the operation screen that further includes the operation portion for calling the processing of the extension function in addition to the operation portion for calling the processing of the portion of the functions when the device management software is started up after the information about the extension function is additionally managed in the table.

Further features will become apparent from the following description of exemplary embodiments with reference to the attached drawings.

BRIEF DESCRIPTION OF THE DRAWINGS

FIG. 3 illustrates an example of a default management screen provided by a device management software according to an exemplary embodiment.

FIGS. 4A to 4C illustrate a transition of a screen regarding generation of a task according to an exemplary embodiment.

DESCRIPTION OF THE EMBODIMENTS

An exemplary embodiment of the present disclosure will be described with reference to the drawings below.

Figure 1:
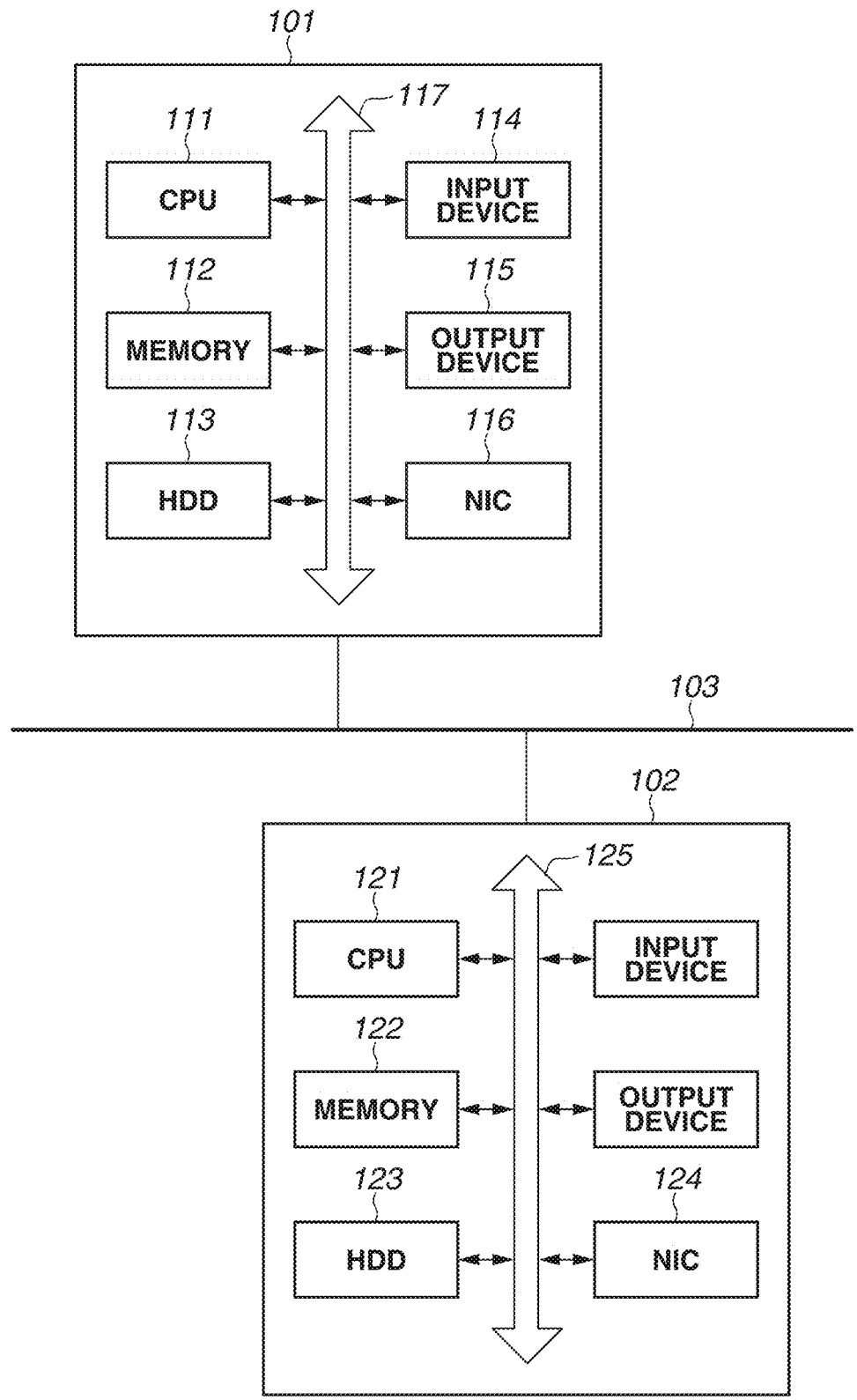
FIG. 1 illustrates an example of a network configuration according to an exemplary embodiment.

FIG. 1 illustrates each apparatus in a network system and a hardware configuration thereof according to the present exemplary embodiment. A management apparatus 101 is an apparatus on which device management software is executed. The device management software is used to manage a network device 102 via a network 103. Examples of the network device 102 include a printing apparatus or a three-dimensional (3D) printer, a home electrical appliance such as a room light, a television, and an air conditioner, and a voice assistant apparatus, connected to a network. Hereinafter, the network device 102 may simply be referred to a "device" in the present disclosure.

On the network 103, a plurality of network devices can be connected to each other. By searching the network for the network devices on the network 103, the device management software stores and manages information about one or more network devices. The device management software can operate the network device via the network 103 by issuing a command to change an operation state of the network device (e.g., a power-off command, a reboot command). Further, the device management software can also realize a function of distributing setting information (e.g., an address book, resource information, a communication schedule, license information, and an application) required for the network device.

The management apparatus 101 includes a central processing unit (CPU) 111, a memory 112, a hard disk drive (HDD) 113, an input device 114, an output device 115, and a network interface 116 therein, which are connected to one another via a bus 117. The CPU 111 loads an operating system (OS), various kinds of programs such as the device management software according to the present exemplary embodiment and data that are stored in the HDD 113 into the memory 112. The CPU 111 executes the programs loaded in the memory 112. The input device 114 acquires information input by a user or the like. The output device 115 outputs information required for an operation of the program, and, for example, displays the information on a display. The network interface (a network interface card (NIC)) 116 transmits and receives a signal to and from the network device 102 via the network 103.

The network device 102 includes a CPU 121, a memory 122, an HDD 123, and a network interface (NIC) 124 therein, which are connected to one another via a bus 125. The CPU 121 loads a program and data stored in the HDD 123 into the memory 122, and executes the program loaded in the memory 122. The NIC 124 transmits and receives a signal to and from the management apparatus 101 via the network 103. The network device 102 includes an input device and an output device specific to the network device 102. For example, in a case where the network device 102 is a printing apparatus, the network device 102 includes an operation panel as an input device, and includes a printing engine that outputs a printed sheet as an output device. In a case where the network device 102 is a voice assistant apparatus, the network device 102 includes, for example, a microphone that acquires a voice of the user as an input device, and includes, for example, a speaker as an output device. The speaker is for notifying the user of, for example, a result of processing according to an instruction such as voice recognition.

Figure 2:
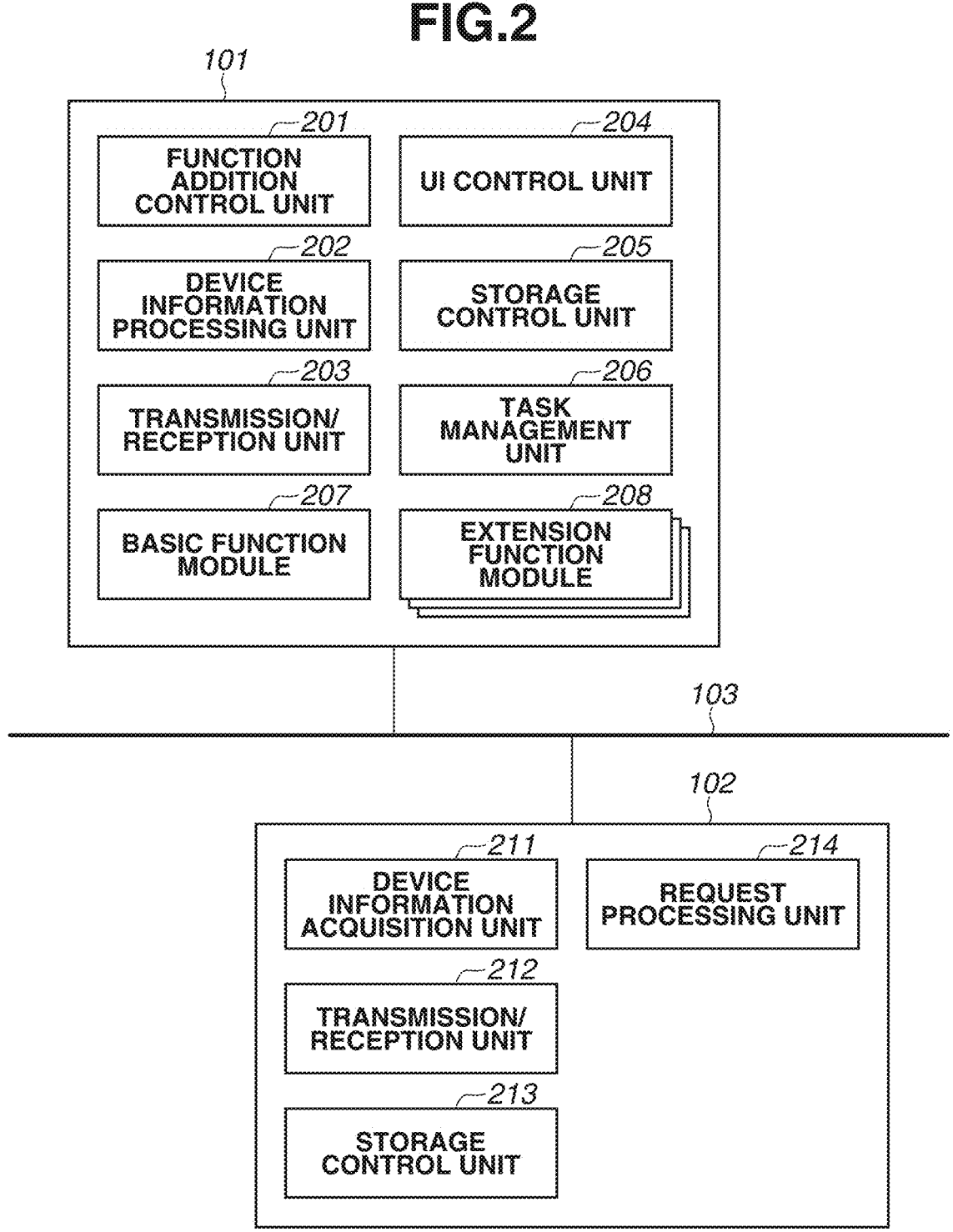
FIG. 2 illustrates an example of a module configuration of software according to an exemplary embodiment.

FIG. 2 illustrates an example of a module configuration of software of the present exemplary embodiment.

The management apparatus 101 includes a function addition control unit 201, a device information processing unit 202, a transmission/reception unit 203, a user interface (UI) control unit 204, a storage control unit 205, and a task management unit 206. These modules are individual function modules implemented by the program (the device management software) according to the present exemplary embodiment that is executed by the CPU 111 of the management apparatus 101.

The function addition control unit 201 controls function addition processing by the management apparatus 101 (or by the device management software that runs on the management apparatus 101). The device information processing unit 202 generates commands to acquire information from the network device 102 and to write information into the network device 102. The device information processing unit 202 processes information received from the network device 102. The transmission/reception unit 203 generates a protocol for transmitting/receiving information between the management apparatus 101 and the network device 102, and controls the transmission/reception of the information. For the transmission/reception of the information between the management apparatus 101 and the network device 102, for example, a protocol called Simple Network Management Protocol (SNMP) is used. A protocol other than SNMP can also be used. The UI control unit 204 generates a screen to be displayed on the output device 115 and controls input information from the input device 114. The storage control unit 205 controls storage, reference, acquisition, and the like of data toward the memory 112 or the HDD 113.

A basic function module 207 is a module for providing a basic function of the management apparatus 101 (or the device management software running on the management apparatus 101). The basic function module 207, for example, generates a task for issuing a command to change an operation state directed to a device targeted for management. The basic function module 207 also provides a function for registering and removing a management target device. At this time, the basic function module 207 carries out a network search and detects a device. By means of, for example, an Internet Protocol (IP) address, a media access control (MAC) address, a serial number of the device, the basic function module 207 can determine whether the detected device is a newly found device or has already been registered. The basic function module 207 also provides a function, with respect to the network device to be managed, of distributing and registering an address book that has not been registered and acquiring an address book that has already been registered from the network device.

The extension function module 208 is a module group of one or more modules composed of programs added by the function addition control unit 201. Examples thereof include a module that provides a function of collecting various kinds of logs from the management target device and generating a report. The examples further include a function for distributing and monitoring a security policy and setting information, a function of distributing a resource file, a function of distributing an application, and a function of distributing license information, and one or more modules providing the respective functions can be realized by a plug-in configuration. The function of distributing and acquiring an address book can also be provided as an extension function instead of a basic function. The device management software can also be constructed as the basic functions by including at least any of the functions cited as the examples of extension functions.

The network device 102 includes a device information acquisition unit 211, a transmission/reception unit 212, a storage control unit 213, and a request processing unit 214. These modules are individual function modules realized by the program executed by the CPU 121 of the network device 102.

The transmission/reception unit 212 receives a request from the management apparatus 101 via the NIC 124. The request processing unit 214 processes the received request. In a case where the content of the request is "reboot", the network device 102 performs reboot processing on the network device 102 itself. In a case where the content of the request is "acquisition of the device information", the device information acquisition unit 211 acquires required device information from the HDD 123 via the storage control unit 213 according to this request. The transmission/reception unit 212 returns a response indicating a result of processing the request to the management apparatus 101 via the NIC 124.

FIG. 3 illustrates an example of a default management screen provided by the device management software.

A menu button 301 is used for calling a list of functions realized by the basic function module 207 and the extension function module 208. A button 302 is used for instructing the device information processing unit 202 to search the network 103 for a device. A button 303 is used for calling a function to add information of a new network device to the device management software. A device list 304 indicates a list of the network devices 102 registered as management targets in the device management software. In a case where a device search has not been carried out since the last start-up of the device management software, the device list 304 includes device information and a status acquired at the last start-up. Thus, the device list 304 may not reflect the latest information. A property region 305 is used for displaying detailed information about the network device selected on the device list 304.

FIGS. 4A to 4C illustrate screens for setting a task defining an operation content for device management that are provided by the device management software. The task defines a content of processing to be performed on the device, a selection of a target device, and a timing at which the processing is performed. FIGS. 4A to 4C illustrate example task setting screens when the report output function provided as the extension function module 208 is selected from the list of functions displayed by selecting the menu button 301.

FIG. 4A illustrates a screen for displaying at least a part of the network devices to be managed by the device management software and to allow the user to select one of the network devices.

A table 1 indicates a management table that manages some part of device information of the network devices discovered by the network search function of the device management software and registered as the management targets. These pieces of device information are stored into the HDD 113 by the storage control unit 205.

TABLE 1

| Device ID | Device Name | IP address |
|---|---|---|
| 12345678 | MFD 2100 | 192.168.2.2 |
| 18993354 | MFD 2200 | 192.168.10.87 |
| 18993344 | MFD 2300 | 192.168.10.100 |
| 189933643 | MFD 2800 | 192.168.10.110 |
| 189933688 | MFD 2850 | 192.168.2.4 |

The UI control unit 204 displays a device selected from the management targets indicated in the table 1. The selected device supports a processing content of a task corresponding to one of the basic function modules 207 or the extension function modules 208. Thus, the UI control unit 204 displays the selected device on a selection screen 401 illustrated in FIG. 4A.

FIG. 4B illustrates an example of a screen for setting a condition of a task regarding the report output function as an extension function module 208. The screen is displayed by the UI control unit 204. On this screen, the user selects items to be output for the report. Besides this example, a screen for setting a different execution condition according to the processing content of the task is supposed to be displayed by the UI control unit 204.

FIG. 4C illustrates an example of a screen displayed by the UI control unit 204 for inputting a schedule when the task is executed. The time when to execute the task such as "immediately", "at a specified date and time", and "regularly-scheduled" (e.g., weekly or monthly), is selected.

The contents selected in FIGS. 4A to 4C are stored into the HDD 113 by the storage control unit 205. The task management unit 206 executes the task according to the specified schedule by referring to the stored information about the task. In the case of the task regarding the report output function, the device management software acquires data, from the target device selected in FIG. 4A, of the content selected in FIG. 4B, generates the report in a predetermined format, and stores the generated report.

Figure 5:
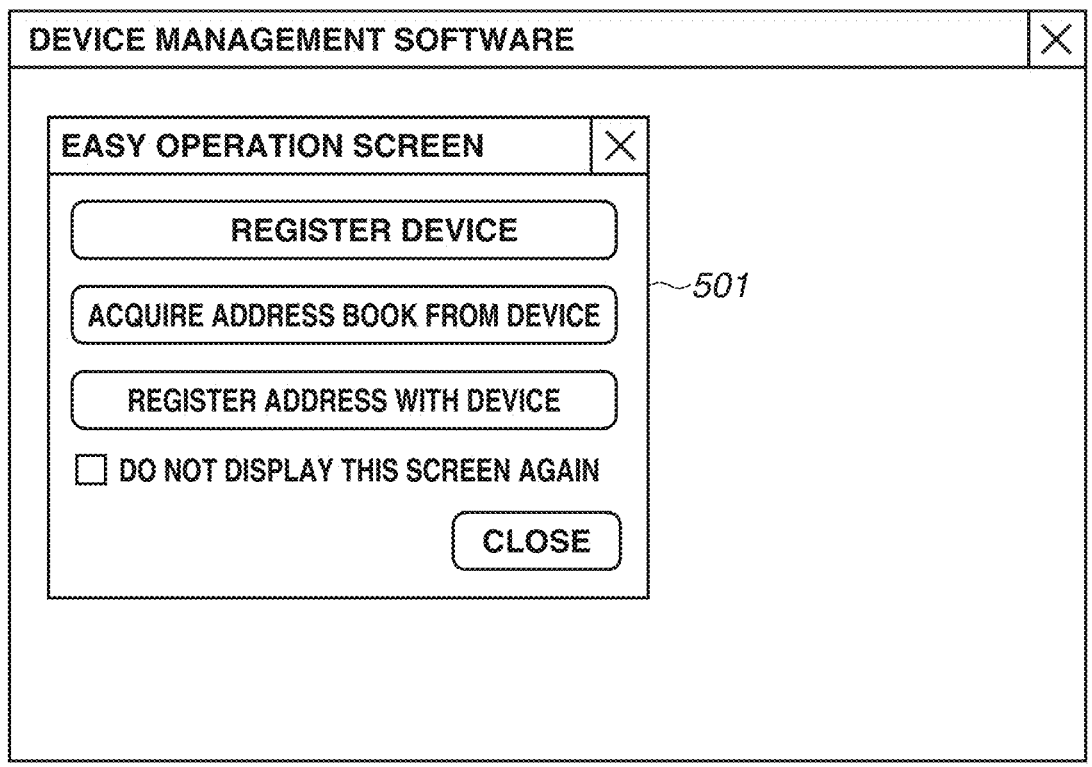
FIG. 5 illustrates an example of an easy operation screen provided by the management apparatus according to an exemplary embodiment.

FIG. 5 illustrates an example of an easy operation screen 501 provided by the device management software. The easy operation screen 501 displays a list of a plurality of operation portions (buttons) for immediately jumping to the task setting processing illustrated in FIGS. 4A to 4C. The easy operation screen 501 is displayed, for example, when the device management software starts up. As understood from a comparison with FIG. 3, when the device management software starts up, the easy operation screen 501 allows the user to easily select a desired function from a plurality of functions narrowed down in advance even without selecting the menu button 301. In a case where the user selects a close button without selecting the plurality of operation portions on the easy operation screen 501, the screen of the output device 115 transitions to the management screen illustrated in FIG. 3. On the easy operation screen 501, in a case where the user specifies a check box "do not display this screen again" and then selects a close button, the screen of the output device 115 transitions to the management screen illustrated in FIG. 3 without displaying the easy operation screen 501 when the device management software starts up next time. While the easy operation screen 501 is displayed, the management screen illustrated in FIG. 3 can also be displayed in the background of the easy operation screen 501. Even in this case, display control or the like is performed so as to prioritize an operation onto the easy operation screen 501.

The UI control unit 204 performs display control of the easy operation screen 501 according to information for displaying the easy operation screen 501 that is stored into the HDD 113 by the storage control unit 205.

An example of the information regarding the easy operation screen 501 that is stored in a predetermined storage area will be described below with reference to a management table (table 2). The UI control unit 204 displays a character string in a "display_string" field managed in the table 2 at each operation portion on the easy operation screen 501 as a character string. When an operation portion on the easy operation screen 501 is pressed by the user, the UI control unit 204 calls the function module of the device management software for, for example, setting a target task like the example illustrated in FIGS. 4A to 4C based on information written in a Uniform Resource Locater (url) field in the table 2.

TABLE 2

Management Table of Easy Operation Screen

| function | url | display_string |
|---|---|---|
| registDevice | http://localhost/DevMC/Plugin/RegistDevice/RegistDevicetask.aspx | Register Device |
| retrieveDeviceAddressBook | http://localhost/DevMC/Plugin/RetDevABTask/RetDevABTask.aspx | Acquire Address Book from Device |
| registDeviceAddressBook | http://localhost/DevMC/Plugin/RegDevABTask/RegDevABTask.aspx | Register Address Book with Device |

Figure 6:
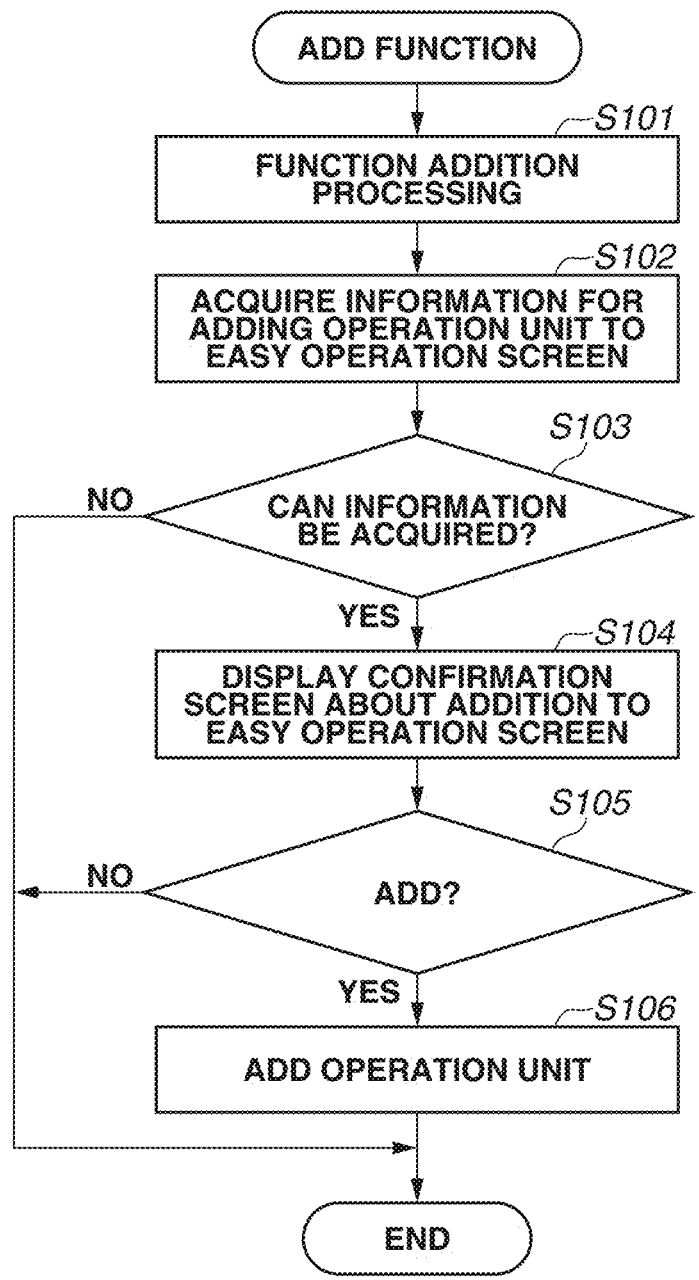
FIG. 6 is a flowchart illustrating processing for function extension by the device management software on the management apparatus according to an exemplary embodiment.
Figure 7:
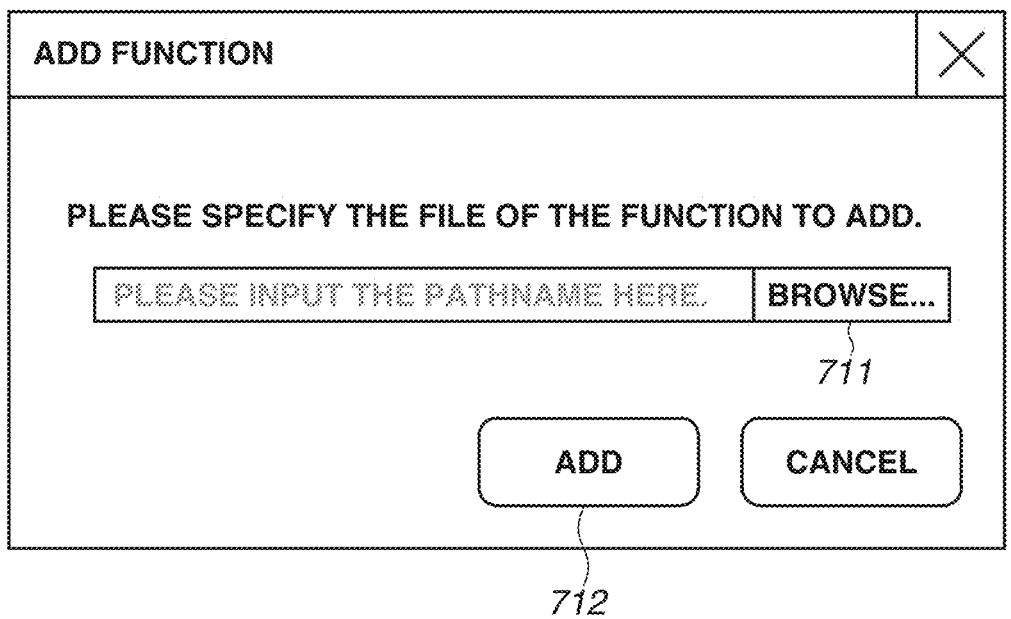
FIG. 7 illustrates a screen for adding a function that is provided by the management apparatus according to an exemplary embodiment.

FIG. 6 illustrates a flowchart indicating processing for adding a function to the device management software on the management apparatus 101. The UI control unit 204 displays a screen usable for the user to issue an instruction to add a function that is illustrated in FIG. 7. The processing illustrated in FIG. 6 is performed by the function addition control unit 201 according to the instruction issued via the function addition screen illustrated in FIG. 7.

In step S101, the user specifies a filename of a file including a program corresponding to the extension function module 208 in a input box 711 on the screen illustrated in FIG. 7. When the user presses an addition button 712, the function addition control unit 201 performs the function addition processing. Specifically, the function addition control unit 201 stores the file into a predetermined area in the HDD 113 via the storage control unit 205, and then performs, for example, processing for installing the program, thereby adding the function module 208 to the device management software.

Figure 8:
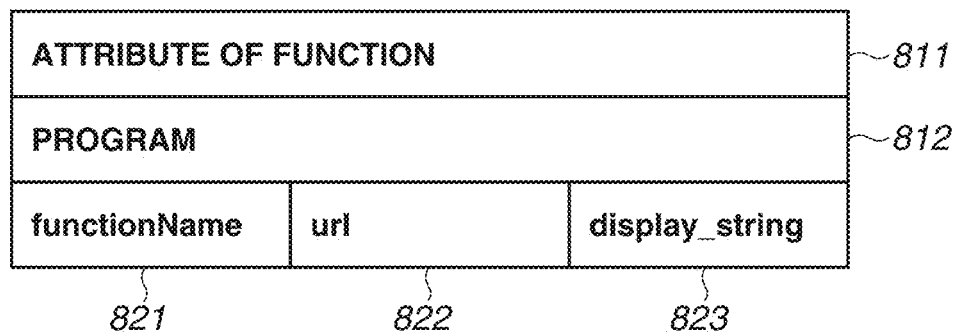
FIG. 8 illustrates an example of a configuration of an added function module according to an exemplary embodiment.

FIG. 8 illustrates a configuration of an extension function module 208. Contents written in the extension function module 208 include an attribute 811 such as a module name, a program 812, a name of a function realized as a task (a function name) 821, a URL 822 for calling a function on the easy operation screen 501, and a display name 823 displayed at the operation portion when the function is registered with the easy operation screen 501.

In step S102, the function addition control unit 201 acquires information about the extension function module 208 for adding an operation portion to the easy operation screen 501 via the storage control unit 205. The extension function module 208, not illustrated, also includes a module that does not have a function that should be registered with the easy operation screen 501.

In step S103, the function addition control unit 201 determines whether the information for adding the operation portion to the easy operation screen 501 can be acquired. In a case where this information is determined to be acquired (YES in step S103), the processing proceeds to step S104. In a case where this information is determined not to be acquired (NO in step S103), the processing illustrated in FIG. 6 ends.

In step S104, the UI control unit 204 displays a confirmation screen (FIG. 9) about the addition of the operation portion regarding the extension function to the easy operation screen 501. In step S105, the function addition control unit 201 determines whether to add the operation portion regarding the extension function according to an input via FIG. 9. In a case where a "YES" button 911 is selected via the confirmation screen illustrated in FIG. 9 (YES in step S105), the processing proceeds to step S106. In a case where a "NO" button 912 is selected via the confirmation screen illustrated in FIG. 9 (NO in step S105), the processing illustrated in FIG. 6 ends.

In step S106, the function addition control unit 201 additionally registers the information acquired in step S102 with the above-described management table of the easy operation screen 501 (a table 3) via the storage control unit 205. An example of the information registered at this time is an entry with "reporting" registered in a function field.

TABLE 3

Management Table of Easy Operation Screen

| function | url | display_string |
|---|---|---|
| registDevice | http://localhost/DevMC/Plugin/RegistDevice/RegistDevicetask.aspx | Register Device |
| retrieveDeviceAddressBook | http://localhost/DevMC/Plugin/RetDevABTask/RetDevABTask.aspx | Acquire Address Book from Device |
| registDeviceAddressBook | http://localhost/DevMC/Plugin/RegDevABTask/RegDevABTask.aspx | Register Address Book with Device |
| reporting | http://localhost/DevMC/Plugin/ReportingTask/Reportingtask.aspx | Output Report |

Figure 10:
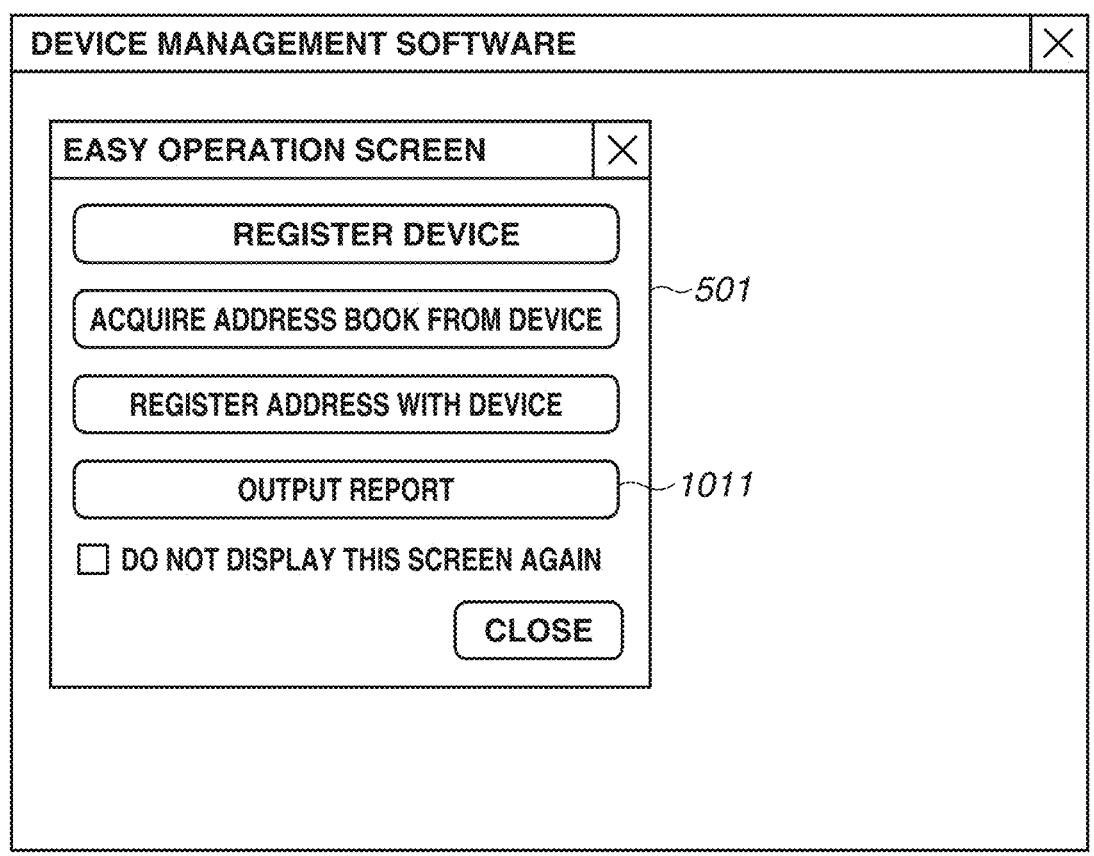
FIG. 10 illustrates an example of the easy operation screen with the operation portion added thereto according to an exemplary embodiment.

FIG. 10 illustrates an example of the easy operation screen 501 after the function is added by the processing illustrated in FIG. 6. FIG. 10 indicates that the operation portion 1011 is added under a name "OUTPUT REPORT".

Through the above described processing, even in a case where a function is added to the device management software, the present exemplary embodiment allows the user to call the processing such as the added task operation from the easy operation screen 501, thereby improving convenience.

The operation portion corresponding to the basic function provided to the device management software running on the management apparatus 101 can also be added to the easy operation screen 501. The UI control unit 204 can provide a setting screen regarding the easy operation screen 501 (not illustrated), list the basic functions (for example, a "remote reboot function" by which the management apparatus 101 reboots the device via the network 103), and allow the user to select a function that the user wants to add. According to the selection thereon, the function addition control unit 201 additionally registers the information about the corresponding function with the management table of the easy operation screen 501. Thus, the operation portion for calling the "remote reboot function" is additionally displayed on the easy operation screen 501.

The remote reboot is carried out by issuing a command to reboot the device in the network 103 with use of the protocol such as SNMP after specifying a target device and when to execute the remote reboot (such as immediately and at a specified arbitrary time).

In the setting screen, operability for selecting a function may be improved by displaying a function corresponding to the operation portion already disposed on the easy operation screen 501 and by displaying a function corresponding to the operation portion not disposed on the easy operation screen 501 distinguishably from each other.

Figure 9:
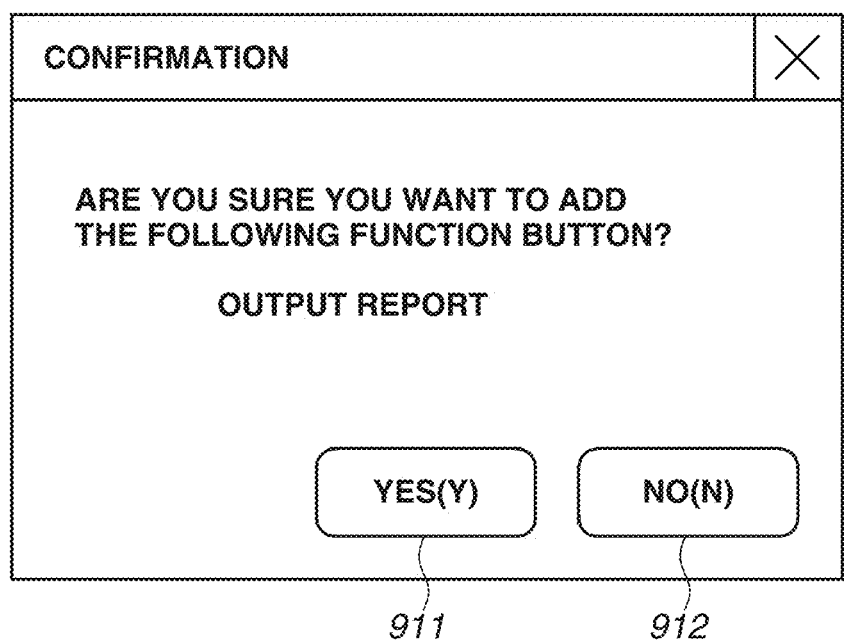
FIG. 9 illustrates a confirmation screen regarding an addition of an operation portion to the easy operation screen that is provided by the management apparatus according to an exemplary embodiment.

Further, the UI control unit 204 may display such a setting screen at the timing of step S104 when the plug-in program is additionally installed into the device management software instead of the above-described screen illustrated in FIG. 9. Alternatively, the UT control unit 204 may display such a setting screen at a timing when the plug-in program is deleted.

An arbitrary operation portion can also be removed from the easy operation screen 501. The UI control unit 204 displays a setting screen (not illustrated) regarding the easy operation screen 501, and allows the user to select an operation portion that the user wants to remove from one or more operation portions currently disposed on the easy operation screen 501. According to the selection thereon, the function addition control unit 201 removes the information about the corresponding function from the management table of the easy operation screen 501, and thus the operation portion for calling the function is not displayed on the easy operation screen 501.

On this setting screen, operability at the time of the selection may be improved by displaying one or more operation portions disposed on the easy operation screen 501 that are prepared by the device management software by default and by displaying an operation portion added by the user (for example, "OUTPUT REPORT") distinguishably from each other.

The setting screen may be configured to prohibit the removal of the one or more operation portions disposed on the easy operation screen 501 that are prepared by the device management software by default, and may require the user to specify the operation portion to be removed from the operation portions added according to the user's instruction.

Further, the UI control unit 204 may provide this setting screen at a timing at which the instruction for newly adding the operation portion to the easy operation screen 501 is issued or at a timing at which the plug-in program is additionally installed into the device management software. Further, the device management software may be configured to allow the user not only to remove the operation portion but also to select the operation portion corresponding to the added function from this setting screen.

Next, a second exemplary embodiment will be described focusing on processing by the basic function module 207 or the extension function module 208 called based on the input of the instruction by the user. Especially, additional processing in a case where a module is called via the easy operation screen 501 will be described in detail. A configuration of each apparatus and the like are similar to the first exemplary embodiment, and therefore descriptions thereof will be omitted here.

Figure 11:
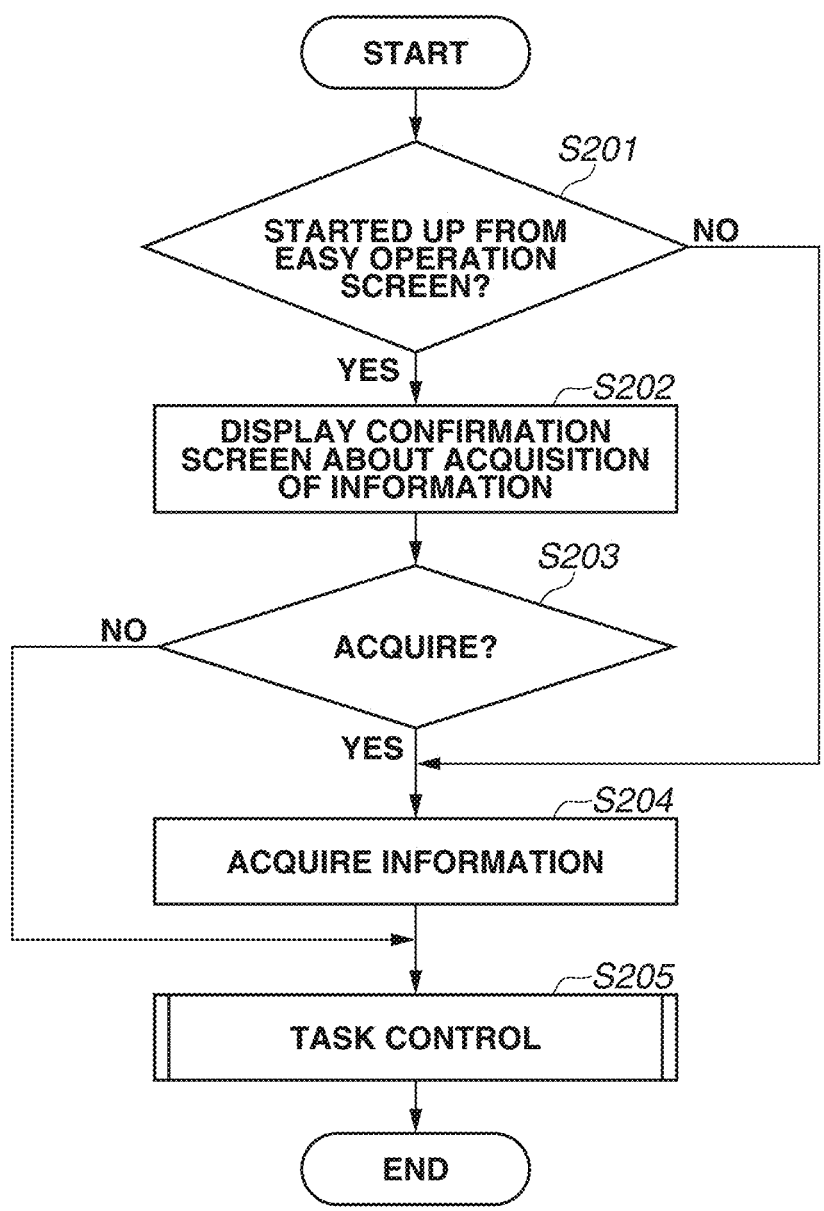
FIG. 11 is a flowchart illustrating processing by a basic function module or an extension function module according to an exemplary embodiment.

FIG. 11 illustrates a flowchart indicating processing by the basic function module 207 or the extension function module 208 called based on the input of the instruction by the user. In the following description, an example of processing in a case where the extension function module 208 that provides the report output function is called will be described specifically.

In step S201, the extension function module 208 determines whether it is started up according to an input using an operation portion 1011 displayed on the easy operation screen 501. In a case where the extension function module 208 is started up from the easy operation screen 501 (YES in step S201), the processing proceeds to step S202. In a case where the extension function module 208 is started up from a method other than the easy operation screen 501 (NO in step S201), the processing proceeds to step S204.

Figure 12:
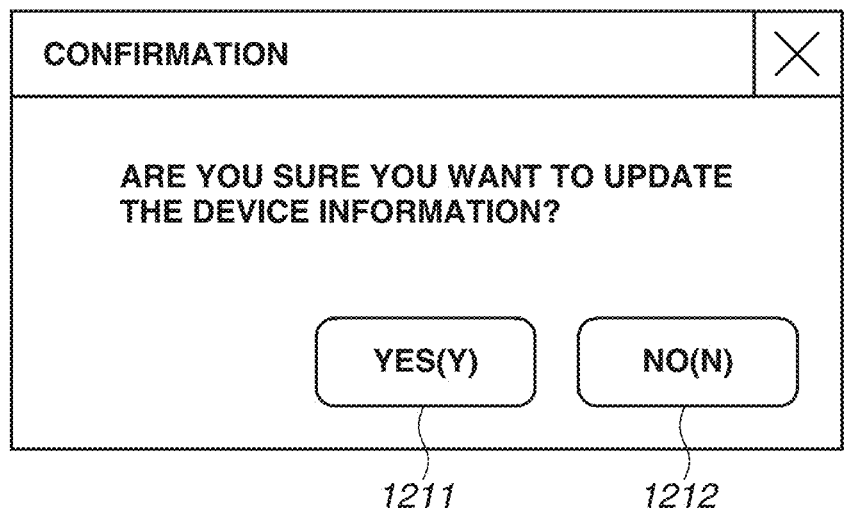
FIG. 12 illustrates a confirmation screen about acquisition of information from the device that is provided by the management apparatus according to an exemplary embodiment.

In step S202, the extension function module 208 displays a confirmation screen (FIG. 12) for confirming whether to acquire the latest information about the network device from the network 103 via the UI control unit 204. FIG. 12 illustrates the confirmation screen for asking the user about whether to acquire the latest information from the network 103. In step S203, the extension function module 208 determines whether a "YES" button 1211 illustrated in FIG. 12 is selected by the user. In a case where the "YES" button 1211 is selected by the user (YES in step S203), the processing proceeds to step S204. In a case where a "NO" button 1212 is selected by the user (NO in step S203), the processing proceeds to step S205.

In step S204, the extension function module 208 transmits, via the device information processing unit 202, a packet of a request to the network 103 for acquiring the latest information about the network device, thereby carrying out the acquisition of the information. In step S204, the device information processing unit 202 inquires of the network device 102 registered as the management target about the latest device information. In step S204, the device information processing unit 202 may collect the latest device information about the network device in the network 103 including even the network device not targeted for the management by, for example, broadcasting search requests to the network 103. In a case where a new device is found, the extension function module 208 may prompt the user to determine whether to add the new device into the management targets before the processing proceeds to step S205, which will be described below.

In step S205, the extension function module 208 executes task control. Specifically, the extension function module 208 proceeds to the processing for setting the task as described above with reference to FIGS. 4A to 4C.

In a case where the user executes the function from the easy operation screen 501, the user may want to immediately perform the operation on the device that the user is already aware of. The case includes a report of a short-term job log and an issue of reboot command with respect to the network device 102. In such a case, the acquisition of the latest device information may be unnecessary.

Therefore, according to the exemplary embodiment, in such a case, when the function is called from the easy operation screen 501, the extension function module 208 eliminates or reduces unnecessary communication with the network device 102, reduces a processing load on the management apparatus 101, and thus promptly performs the task control by skipping the acquisition of the information about the network device 102.

In the present exemplary embodiment, in a case where the "NO" button 1212 illustrated in FIG. 12 is selected by the user in step S203, the information acquisition processing in step S204 is omitted. The functions realized by the basic function module 207 or the extension function module 208 include a function involving performing similar information acquisition processing to step S204 when the task is executed.

In a case where the "NO" button 1212 illustrated in FIG. 12 is selected by the user in step S203, a previous information is stored in a predetermined area via the storage control unit 205 and is managed. Thus, when executing the task set in the control in step S205, the basic function module 207 or the extension function module 208 refers to the managed information and also omits the information acquisition processing when executing the task.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-028259, filed Feb. 20, 2018, which is hereby incorporated by reference herein in its entirety.

What is claimed is:

1. A management apparatus comprising:
a memory storing instructions related to a device management software that realizes a plurality of functions; and
at least one processor which, when executing the instructions, causes the management apparatus to:
manage, as management information, information about a portion of the plurality of functions, wherein the management information includes information about functions to be displayed on an operation screen;
provide the operation screen when the device management software is started up, wherein the operation screen includes default operation buttons for calling processing of each of the functions that corresponds to the management information, and the operation screen includes an option specification part for receiving an instruction for not displaying the operation screen from a next startup of the device management software and a close button;
provide a management screen displaying information indicating a network device to be managed by the device management software, wherein the operation screen is provided without menu selection on the management screen when the device management software is started up so that a higher priority is given to operation on the operation screen than on the management screen, and wherein, in a case where the close button is pressed on the operation screen, the operation screen becomes not displayed so as to enable acceptance of operation on the management screen;
add information about an extension function to the management information in a case where the extension function is added to the device management software; and
when the device management software is started up after the information about the extension function is additionally managed as part of the management information, provide on the operation screen an additional operation button for calling processing of the extension function in addition to the default operation buttons, wherein the operation screen on which the additional operation button is provided also includes the option specification part,
wherein the operation screen is provided in a foreground of the management screen in response to start-up of the device management software, and
wherein, when the device management software is started up after the instruction is received via the option specification part, the management screen is provided without providing the operation screen.

2. The management apparatus according to claim 1,
wherein the instructions further cause the management apparatus to provide a confirmation screen for confirming whether to add, to the operation screen, the additional operation button related to the extension function in a case where the extension function is added to the device management software, and
wherein the information about the extension function is added to the management information in a case where an input indicating the addition of the additional operation button is received via the confirmation screen.

3. The management apparatus according to claim 1, wherein the instructions further cause the management apparatus to, in a case where one of the default operation buttons and the additional operation button is selected via the operation screen, provide a setting screen regarding a function corresponding to the selected button.

4. The management apparatus according to claim 1, wherein the instructions further cause the management apparatus to remove the information about the extension function from the management information in response to a user instruction.

5. The management apparatus according to claim 1, wherein the extension function is a function different from any of the following functions: a function of registering the network device, a function of acquiring an address book from the network device, and a function of registering the address book with the network device.

6. The management apparatus according to claim 1, wherein the plurality of functions of the device management software includes a function of generating a report based on a log acquired from the network device.

7. The management apparatus according to claim 1, wherein the plurality of functions of the device management software includes a function of issuing a command that changes an operation state to the network device.

8. The management apparatus according to claim 1, wherein the network device includes at least one of a printing apparatus, a three-dimensional (3D) printer, a home electrical appliance, or a voice assistant apparatus.

9. A method in a management apparatus for realizing a plurality of functions for performing processing on a network device, the method comprising:
managing, as management information, information about a portion of the plurality of functions, wherein the management information includes information about functions to be displayed on an operation screen;
providing the operation screen when the device management software is started up, wherein the operation screen includes default operation buttons for calling processing of each of the functions that corresponds to the management information, and the operation screen includes an option specification part for receiving an instruction for not displaying the operation screen from a next startup of the device management software and a close button;
providing a management screen displaying information indicating a network device to be managed by the device management software, wherein the operation screen is provided without menu selection on the management screen when the device management software is started up so that a higher priority is given to operation on the operation screen than on the management screen, and wherein, in a case where the close button is pressed on the operation screen, the operation screen becomes not displayed so as to enable acceptance of operation on the management screen;

adding information about an extension function to the management information in a case where the extension function is added to the device management software; and when the device management software is started up after the information about the extension function is additionally managed as part of the management information, providing on the operation screen an additional operation button for calling processing of the extension function in addition to the default operation buttons, wherein the operation screen on which the additional operation button is provided also includes the option specification part, wherein the operation screen is provided in a foreground of the management screen in response to start-up of the device management software, and wherein, when the device management software is started up after the instruction is received via the option specification part, the management screen is provided without providing the operation screen.

10. A non-transitory computer readable storage medium on which is stored a computer program for making a computer execute a method for realizing a plurality of functions for performing processing on a network device, the method comprising:

managing, as management information, information about a portion of the plurality of functions, wherein the management information includes information about functions to be displayed on an operation screen;

providing the operation screen when the device management software is started up, wherein the operation screen includes default operation buttons for calling processing of each of the functions that corresponds to the management information, and the operation screen includes an option specification part for receiving an instruction for not displaying the operation screen from a next startup of the device management software and a close button;

providing a management screen displaying information indicating a network device to be managed by the device management software, wherein the operation screen is provided without menu selection on the management screen when the device management software is started up so that a higher priority is given to operation on the operation screen than on the management screen, and wherein, in a case where the close button is pressed on the operation screen, the operation screen becomes not displayed so as to enable acceptance of operation on the management screen;

adding information about an extension function to the management information in a case where the extension function is added to the device management software; and when the device management software is started up after the information about the extension function is additionally managed as part of the management information, providing on the operation screen an additional operation button for calling processing of the extension function in addition to the default operation buttons, wherein the operation screen on which the additional operation button is provided also includes the option specification part, wherein the operation screen is provided in a foreground of the management screen in response to start-up of the device management software, and wherein, when the device management software is started up after the instruction is received via the option specification part, the management screen is provided without providing the operation screen.

* * * * *